United States Patent [19]

Guy

[11] Patent Number: 4,909,547

[45] Date of Patent: Mar. 20, 1990

[54] COUPLER ARRANGEMENT

[75] Inventor: Robert R. Guy, Northfield, Ohio

[73] Assignee: Chardon Rubber Company, Chardon, Ohio

[21] Appl. No.: 199,091

[22] Filed: May 26, 1988

[51] Int. Cl.[4] .......................................... F16L 33/24
[52] U.S. Cl. .................................. 285/169; 285/331; 285/903; 285/423; 138/121
[58] Field of Search ................. 285/57, 169, 260, 331, 285/423, 903; 138/120, 121, 122, 109, 173, 177, 178

[56] References Cited

U.S. PATENT DOCUMENTS

| | | | |
|---|---|---|---|
| 2,488,229 | 11/1949 | Noojin | 285/169 |
| 3,008,738 | 11/1961 | Longfellow | 285/422 X |
| 3,493,251 | 2/1970 | Kramer | 285/260 |
| 3,662,087 | 5/1972 | Singletary | 285/169 X |
| 3,708,187 | 1/1973 | Campbell | 285/903 X |
| 4,081,190 | 3/1978 | Itzler | 285/423 X |
| 4,314,717 | 2/1982 | Bjurman | 138/121 X |
| 4,453,749 | 6/1984 | McKinnon | 285/423 X |
| 4,484,769 | 11/1984 | Lacey | 285/423 X |
| 4,542,922 | 9/1985 | Grossauer | 285/903 X |

FOREIGN PATENT DOCUMENTS

| | | | |
|---|---|---|---|
| WO8100748 | 3/1981 | PCT Int'l Appl. | 285/903 |
| 1559645 | 1/1980 | United Kingdom | 285/57 |
| 2107814 | 5/1983 | United Kingdom | 285/260 |

Primary Examiner—Randolph A. Reese
Assistant Examiner—Anthony Knight
Attorney, Agent, or Firm—Renner, Kenner, Greive, Bobak, Taylor & Weber

[57] ABSTRACT

An improved connecting arrangement (10) by which to secure one end of a drain conduit (12) to the stub conduit (13) of a drain port (14). A unique coupler (11) is interposed between one end of the drain conduit (12) and the port (14). The coupler (11) has an annular sleeve portion (20) and an annular fitting portion (21) that are joined by a generally annular transitional portion (24) which is interposed between the sleeve and fitting portions (20 and 21, respectively). The hollow interior (22) of the sleeve portion is provided with threads (25), and an annular sealing recess (26), which opens toward the interior of the sleeve portion (20), is presented from the interior of the transitional portion (24). A novel drain conduit (12) interconnects with the coupler (11). The drain conduit (12) is provided in substantially continuous lengths and has a body portion (15) with a plurality of threaded portions (16) provided at longitudinally spaced locations along the body portion (15). An annular spacer portion (18) is interposed along the length of each threaded portion (16) to divide the threaded portion (16) into two sections (16A and 16B). The conduit (12) is severable transversely along selected spacer portions (18) to provide the desired length of conduit (12). When thus properly severed each threaded section (16A and 16B) terminates in a sealing lip (30) formed by the severed spacer portion (18). The sealing lip (30) is frictionally received within the sealing recess (26) when the threaded portion (16) on the conduit (12) has been tightened onto the threads (25) within the sleeve portion (20) of the coupler (11). The fitting portion (21) may be affixed to the stub conduit (13) of the drain port (14) by a hose clamp (31).

7 Claims, 2 Drawing Sheets

COUPLER ARRANGEMENT

TECHNICAL FIELD

The present invention relates generally to connecting arrangements for certain plumbing installations. More particularly, the present invention relates to a connecting arrangement by which a uniquely configured conduit may be secured to the stub of a drain port by virtue of a uniquely compatible coupler. Specifically, the present invention relates to a connecting arrangement by which a novel connecting element incorporated on at least one end of a convoluted, flexible drain conduit interacts with a unique coupler to effect a leak-proof connection between the drain conduit and a stub conduit of the type employed as the drain port in washing machines, dishwashers and other similar appliances.

BACKGROUND OF THE INVENTION

Dishwashers, washing machines and other similar appliances are normally equipped with a drain port through which waste water may be removed. For such an installation a drain conduit, or hose, is generally employed to convey the waste water to a sanitary waste system. Two heretofore known connecting arrangements epitomize the prior art configurations employed to secure drain conduits to appliances. In the first type of prior art arrangement the drain conduit is provided with an integral connector that is configured specifically for effecting a mating connection with a complementarily configured stub conduit which constitutes the drain port of the appliance. In the second type of prior art arrangement, the drain conduit may have a uniform configuration throughout its length, in order that any desired length thereof may simply be severed from a supply source.

One form for an integral connector employed with the first type connecting arrangement incorporates a soft rubber sealing means molded inside that end of the drain conduit which is to be attached to the stub conduit of the drain port. A typical sealing means comprises a plurality of generally semicircular ribs that are molded onto the interior surface of the drain conduit in proximity to that end thereof which is to be secured to the stub conduit of the drain port provided on the appliance. The consecutive ribs are longitudinally spaced and are each disposed approximately 180° relative to the immediately adjacent ribs. The stub conduit is inserted into the drain conduit, and a hose clamp is tightened over the drain conduit to secure it onto the stub conduit of the drain port and thereby effect the requisite seal. With this type arrangement—i.e., the type arrangement wherein the drain conduits are provided with an integral connector—the conduits must be provided in lengths that may prove to be excessively long for the vast majority of installations. Nevertheless, the excessive length is necessary in order to accommodate installations in virtually any environment that may be encountered in the field. However, once the required length of such a conduit is determined, the length removed is rendered unusable inasmuch as it no longer presents the requisite, integral connector. To ameliorate the waste of material which naturally occurs as a result of severing the excessive length of conduit from drain conduits incorporating integral connectors, drain conduits having integral connectors are generally produced in several standard lengths which comport to the lengths most frequently encountered. While some conservation is thus achieved, this approach requires that the installer stock drain conduits in a wide variety of lengths, and even then there will be some waste and no assurance that the longest standard length will accommodate all environments encountered.

When the drain conduit is provided with a uniform cross section throughout its length—i.e., without an integral connector—the precise length desired can be cut from a supply source, but the heretofore employed arrangements by which to secure the drain conduit to the drain port of the appliance have not proven to be wholly satisfactory. In one such arrangement the stub conduit of the drain port is attached to the appliance by inserting the stub conduit into a rubber grommet, or other washer, fitted within the end of the drain conduit. Such an installation requires that close dimensional tolerances be maintained for the stub conduit, the grommet and the drain conduit. Maintaining dimensional tolerances for three separate components itself tends to preclude reliably leak-proof installations. In addition, it should be appreciated that even if the dimensional tolerances can be maintained, over time the requisite tight fit between the grommet, the drain conduit and the stub conduit will begin to loosen, and when that occurs the integrity of the seal is lost and water leakage is the likely result.

Inasmuch as the drain conduit must necessarily be flexible and sturdy, conventional drain conduits are generally formed of convoluted, polymeric material. The convolutions not only contribute to the flexibility of the drain conduit, they also assist the passage of waste water therethrough by creating a swirling action.

The use of a drain conduit having a uniform cross section is the only prior known arrangement by which to accomodate the desired capability of being able to determine, and select, the most propitious length for the drain conduit, on site. When a drain conduit having a uniform cross section is employed such adaptability is achieved. However, experience reveals that the prior known arrangement do not provide the desired, long lasting, waterproof integrity to the connection.

SUMMARY OF THE INVENTION

It is, therefore, a primary object of the present invention to provide an improved connecting arrangement which assures a water-tight seal.

It is another object of the present invention to provide an improved connecting arrangement, as above, which permits on site selection of the length of the drain conduit so that it will accommodate to any environment encountered.

It is a further object of the present invention to provide an improved connected arrangement, as above, which is relatively uncomplicated, and inexpensive, to manufacture and use.

It is still another object of the present invention to provide an improved connecting arrangement, as above, which employs a unique coupler that interacts with a complimentarily unique flexible conduit.

These and other objects of the invention, as well as the advantages thereof over existing and prior art forms, which will be apparent in view of the following detailed specification, are accomplished by means hereinafter described and claimed.

In general, an improved connecting arrangement embodying the concepts of the present invention employs a coupler which is interposed between one end of a flexible conduit and a drain port. The coupler has an annular sleeve portion at one end and an annular fitting portion at the other end. The annular sleeve portion and the annular fitting portion are disposed with the hollow interiors of each portion being generally oriented in longitudinal alignment. A generally annular transitional portion is interposed between the sleeve and fitting portions and joins these two portions into an integral whole.

The interior of the annular sleeve portion presents a thread means to engage a complimentarily threaded portion adjacent the end of the drain conduit. The transitional portion presents an axially oriented, annular sealing recess which opens toward the interior of the sleeve portion frictionally to receive an annular sealing lip longitudinally adjacent the end of the threaded portion on the drain conduit when the threads within the sleeve portion are snugly tightened onto the threaded portion of the drain conduit, the sealing lip is frictionally received within the sealing recess. The interaction between these components effects a fluid tight seal. The drain hose is configured such that an appropriate length may be selected at the time of installation and severed from a longer section without waste.

One exemplary embodiment of improved connecting arrangement deemed sufficient to effect a full disclosure of the subject invention is shown by way of example in the accompanying drawings and is described in detail without attempting to show all of the various forms and modifications in which the invention might be embodied; the invention being measured by the appended claims and not by the details of the specification.

DESCRIPTION OF AN EXEMPLARY EMBODIMENT

Figure 1:
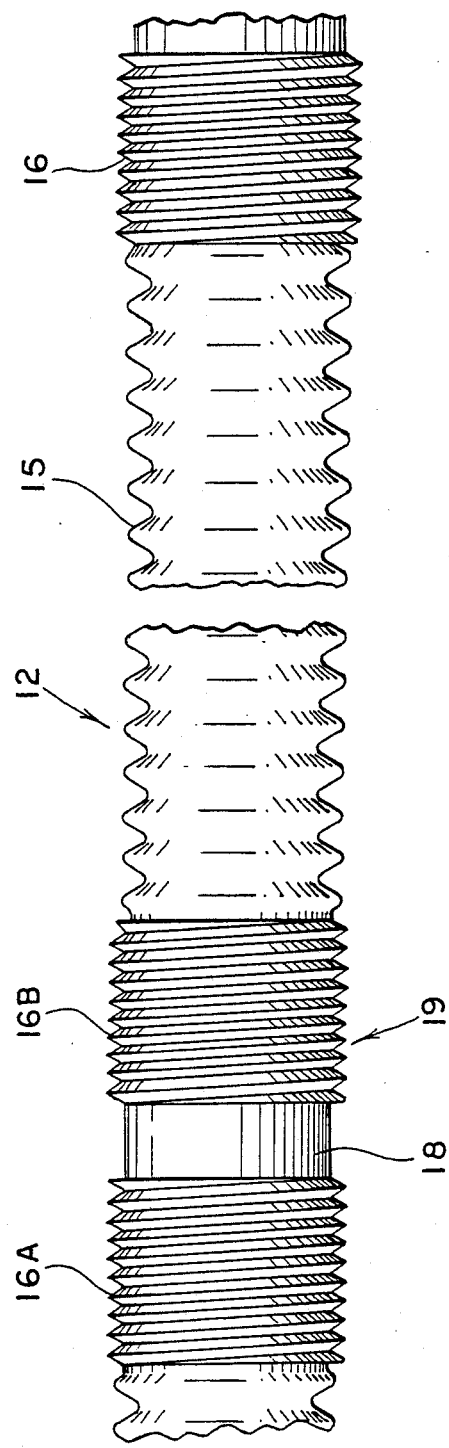
FIG. 1 is a side elevation view of a convoluted drain conduit which incorporates the novel coupling element utilized in a connecting arrangement embodying the concepts of the present invention.

One representative form of an improved connecting arrangement embodying the concepts of the present invention is designated generally by the numeral 120 on the accompanying drawings. The representative connecting arrangement 10 employs a unique coupler 11 by which to secure a compatibly unique drain conduit 12 to the stub conduit 13 of a drain port 14 presented from an appliance, not shown.

The drain conduit 12 has a body portion 15 which is preferably convoluted to enhance flexibility. A plurality of threaded portions 16 are spaced at longitudinal intervals along the length of the body portion 15. Each threaded portion 16 may be separated into two longitudinally spaced sections 16A and 16B by interposing an annular spacer portion 18 therebetween. It is possible to provide only a single threaded portion 16, comprising either threaded section 16A or 16B, adjacent to at least one end of the spacer portion 18. However, the use of two threaded sections 16A and 16B which lie, one adjacent to each longitudinal edge of the spacer portion 18 allows either end of a severed length of drain conduit 12 to be connected to the unique coupler 11, as will be hereinafter more fully explained.

Each threaded portion 16A and 16B and a length of the spacer portion 18 interposed therebetween cooperate to present a coupling connector 19 which will interact with the coupler 11, as will also be hereinafter more fully explained.

The drain conduit 12 may be suitably fabricated from a conventional plastic material. For example, the drain conduit 12 may be fabricated from a polymeric material such as polypropylene. This material not only provides a conduit 12 having the desired characteristics but also may be fabricated in a continuous length by continuous blow molding techniques, which are well known to the art, to provide the configuration required for the present invention.

The coupler 11, which is operatively interposed between the drain conduit 12 and the drain port 14, has an annular sleeve portion 20 at one end thereof and an annular fitting portion 21 at the opposite end thereof. The hollow interior 22 of the annular sleeve portion 20 is oriented in generally longitudinal alignment with the hollow interior 23 of the annular fitting portion 21. A generally annular transitional portion 24 is interposed between said sleeve and fitting portions 20 and 21, respectively, to effect a joinder between the sleeve and fitting portions. In fact, the sleeve, fitting and transitional portions 20, 21 and 24, respectively, are preferably formed as an integral whole.

The cylindrical configuration presented by the hollow interior 22 of the annular sleeve portion 20 is threaded, as at 25, to permit a threaded connection between the sleeve portion 20 and a selected threaded section 16A or 16B on the drain conduit 12.

Figure 2:
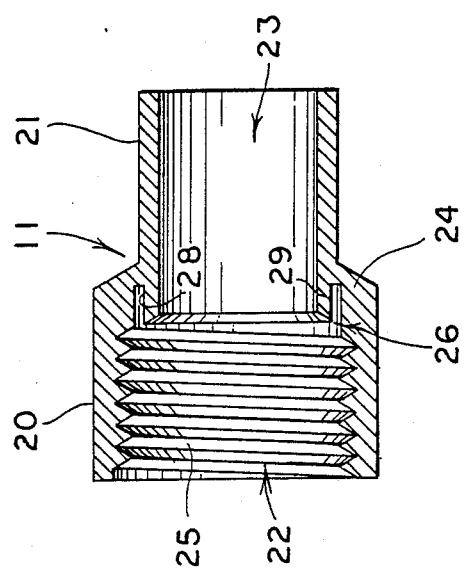
FIG. 2 is a longitudinal cross section through a unique coupler which is utilized in conjunction with a drain conduit incorporating the coupling element depicted in FIG. 1; and, FIG. 3 is a longitudinal section similar to FIG. 2 but depicting the drain conduit, in side elevation, operatively received within the coupler.

An axially oriented, annular sealing recess 26 is presented from the transitional portion 24. The sealing recess 26 opens toward the hollow interior 22 of the sleeve portion 20. The radially exterior surface 28 of an annular wall 29 which delineates the innermost circumference of the transitional portion 24 defines the radially innermost boundary of the sealing recess 26. The radially outermost boundary of the sealing recess 26 is delineated by the transitional portion 24. In addition, the transitional portion 24 accommodates any difference between the outermost diameters of the sleeve and fitting portions 20 and 21, respectively, which are joined by the transitional portion 24. As shown in FIG. 2, the interior of the sleeve portion 20 has a greater diameter than the outermost boundary of the sealing recess 26 to accommodate the desired fit of the drain conduit 12 within the coupler 11, as will be hereinafter more fully described.

The coupler 11 is preferably made of a thermoplastic rubber or polymer to provide the desired characteristics and also to permit the part to be injection molded. One perfectly suitable material from which the coupler 11 can be molded is vinyl nitrile which is available from Monsanto under the trademark Santoprene.

The advantages of a connecting arrangement 10 embodying the concepts of the present invention may, perhaps, be more fully appreciated by describing a typical example as to its use. To connect the drain port 14 of an appliance, not shown, to the available sanitary system the installer would first determine the appropriate length of drain conduit 12 necessary to connect the appliance to the sanitary system. The distance measured would be from the stub conduit 13 of the drain port 14 to an access opening into the sanitary system. The drain conduit 12 would then be cut to the appropriate length by making a transverse cut through approximately the midpoint of the most appropriate spacer portion 18—i.e., that spacer portion 18 which is just beyond the required length. This cut transforms the spacer portion 18 into a sealing lip 30 at the end of each threaded section 16A and 16B.

The coupler 11 is then attached to one end of the drain conduit 12. This attachment simply requires the installer to screw the sleeve portion 120 of the coupler 11 onto the connecting element 19 presented at the selected end of the drain conduit 12. As the coupler 11 is threaded onto the end of the drain conduit 12, the sealing lip 30 is insertably received for a friction tight engagement within the sealing recess 26 interiorly of the coupler 11, thereby forming a water-tight seal.

Figure 3:
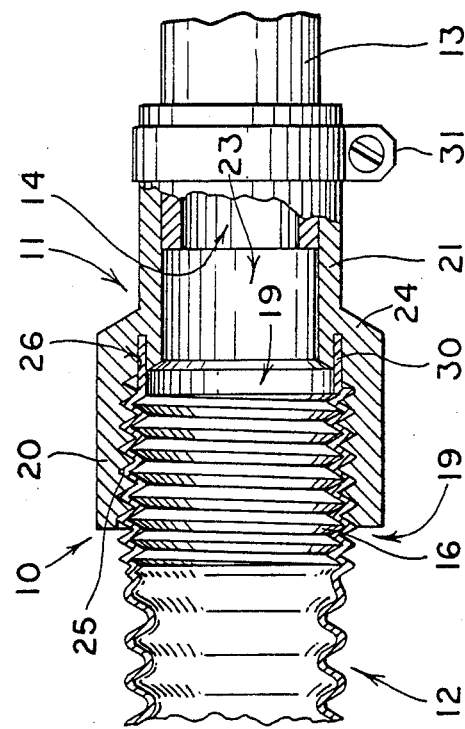

The sleeve portion 20 of the coupler 11 has an internal diameter that is preferably at least modestly larger than the radially outer boundary of the sealing recess 26 in order to facilitate entry of the sealing lip 30 into the sealing recess 26 when the coupler 11 is tightened onto the threaded portion 16 of the drain conduit 12. The drain conduit 12 and the coupler 11 are thus connected together to form the improved connecting arrangement of the present invention in the manner best depicted in FIG.3.

Although it has not been found to be necessary, those who wish to take extra precautions in order to assure a water-tight seal may apply a hot melt polyethylene wax onto the threaded section 16A or 16B before it is screwed into the sleeve portion 20 of the coupler 11.

With the drain conduit 12 thus secured to the coupler 11, the stub conduit 13 of the drain port 14 is simply inserted into the fitting portion 21 of the coupler 11, and the fitting portion may be secured thereto by tightening a hose clamp 31 about the fitting portion 21 with the stub conduit 13 received therein. Stub conduits 13 generally emanate from the exhaust side of the drain pump utilized by the appliance. It should be appreciated that the present invention is not limited to use in conjunction with only drain connecting arrangements. The environment of the drain connecting arrangement was utilized solely for exemplary purposes; it was not chosen to limit the scope of the present invention.

In any event, the opposite end of drain conduit 12, not shown, is then inserted, or otherwise connected, to an access opening in the sanitary system. The appliance which utilizes the improved connecting arrangement then may be operated in its customary manner.

As should now be apparent, the present invention not only provides an improved connecting arrangement which assures a water-tight seal but also accomplishes the other objects of the invention.

I claim:

1. A connecting arrangement by which to secure one end of a conduit to the stub conduit of a port comprising:
   a coupler interposed between the one end of the conduit and the stub port;
   said conduit being provided in substantial lengths having threaded portions longitudinally spaced along the length of said conduit, an annular spacer portion interposed along the length of each said threaded portion to divide said threaded portion into two sections, and said conduit being severable transversely across selected spacer portions to provide the desired length of conduit for the installation in which it is to be employed;
   the said one end of the conduit presenting a threaded portion which terminates in an annular sealing lip;
   said coupler having an annular sleeve portion and an annular fitting portion, said sleeve and fitting portions disposed with the hollow interiors thereof being generally oriented in longitudinal alignment;
   a generally annular transitional portion interposed between said sleeve and fitting portions to effect a joinder therebetween;
   means by which to secure said fitting portion to said stub port;
   the interior of said annular sleeve portion presenting thread means to engage the threaded portion on the said one end of the conduit;
   said transitional portion presenting an axially oriented, annular sealing recess which opens toward the interior of said annular sleeve portion; and,
   said sealing lip on the said one end of the conduit being frictionally received within said sealing recess in said transitional portion.

2. A connecting arrangement, as set forth in claim 1, wherein:
   said conduit is flexible.

3. A connecting arrangement, as set forth in claim 1, wherein:
   an annular wall is disposed within the transitional portion such that the radially interior surface of said annular wall delineates the innermost circumference of said transitional portion, the radially exterior surface of said annular wall defines the radially interior boundary of said sealing recess, and the radially exterior boundary of said sealing recess is defined by the outermost interior circumference of said transitional portion.

4. A connecting arrangement, as set forth in claim 3, wherein:
   the interior of said annular sleeve portion has a greater diameter than said sealing recess.

5. A connecting arrangement, as set forth in claim 4, wherein:
   said conduit is flexible.

6. A connecting arrangement, as set forth in claim 1, wherein:
   said conduit is convoluted between said longitudinally spaced spacer portions associated with each said threaded portion to provide flexibility.

7. A connecting arrangement, as set forth in claim 5, wherein:
   said conduit is fabricated from a polymeric material.

* * * * *

UNITED STATES PATENT AND TRADEMARK OFFICE
CERTIFICATE OF CORRECTION

PATENT NO. : 4,909,547
DATED : March 20, 1990
INVENTOR(S) : Robert R. Guy

It is certified that error appears in the above-identified patent and that said Letters Patent is hereby corrected as shown below:

In Column 2, line 41, delete "arrangement" and substitute therefor ---arrangements---;

In Column 3, line 35, delete "elevation" and substitute therefor ---elevational---;

In Column 3, line 51, delete "120" and substitute therefor ---10---; and

In Column 5, line 11, delete "120" and substitute therefor ---20---.

Signed and Sealed this

Twenty-third Day of August, 1994

Attest:

BRUCE LEHMAN

*Attesting Officer*   *Commissioner of Patents and Trademarks*